(No Model.) 2 Sheets—Sheet 1.
J. A. HORTON.
COOKING STOVE.
No. 253,206. Patented Feb. 7, 1882.
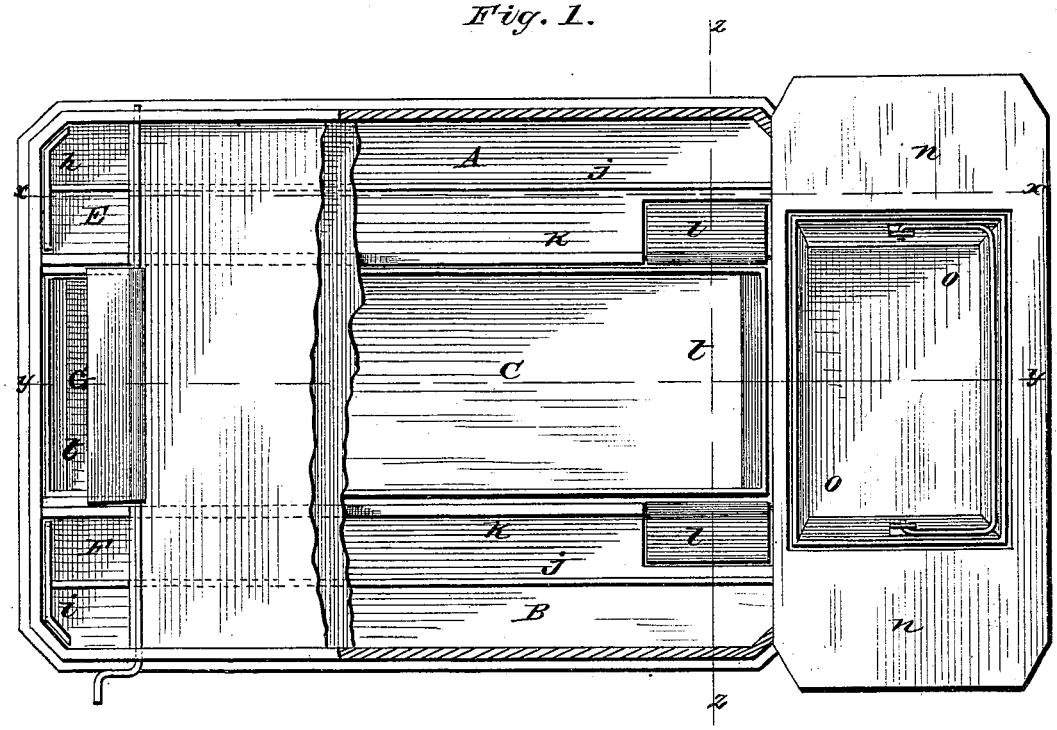
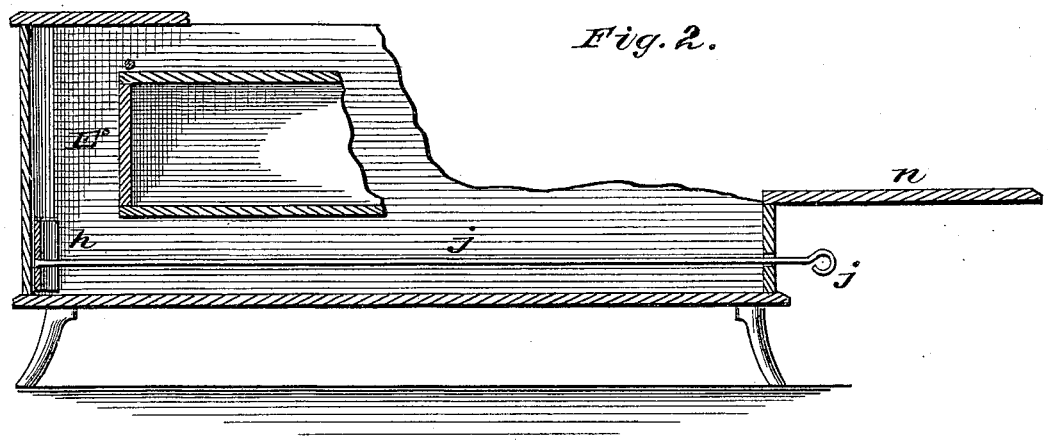
WITNESSES
INVENTOR
James A. Horton
By J. J. Johnston
Attorney
N. PETERS. Photo-Lithographer, Washington, D. C.

(No Model.) 2 Sheets—Sheet 2.

J. A. HORTON.
COOKING STOVE.

No. 253,206. Patented Feb. 7, 1882.

WITNESSES
Fred. G. Dieterich.
F. C. Dieterich.

INVENTOR
James A. Horton
By J. J. Johnston
Attorney

UNITED STATES PATENT OFFICE.

JAMES A. HORTON, OF NEW CASTLE, PENNSYLVANIA.

COOKING-STOVE.

SPECIFICATION forming part of Letters Patent No. 253,206, dated February 7, 1882.

Application filed November 22, 1881. (No model.)

*To all whom it may concern:*

Be it known that I, JAMES A. HORTON, of New Castle, in the county of Lawrence, State of Pennsylvania, have invented a new and useful Improvement in Stoves; and I do hereby declare that the following is a full, clear, and exact description thereof, reference being had to the accompanying drawings, and to the letters of reference marked thereon.

My invention relates to an improvement in cooking-stoves; and it consists in combining with the flues of the stove gates, valves, scrapers, and receiving-pan, arranged with relation to each other so that the refuse of combustion which accumulates in the outer flues may be drawn forward and collected in a pan in the center flue, which pan may subsequently be removed for the purpose of disposing of the refuse of combustion, all of which will more fully and at large appear.

To enable others skilled in the art with which my invention is most nearly connected to make and use it, I will proceed to describe its construction and operation.

Figure 3:
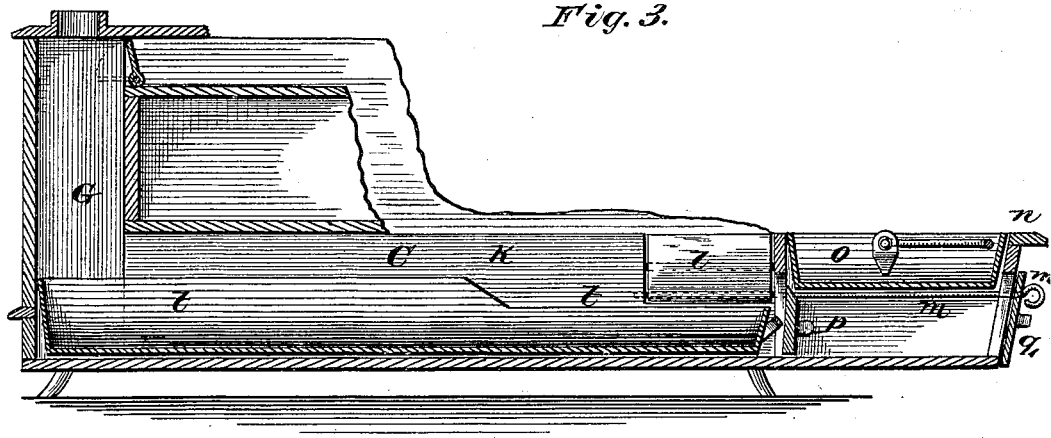
Figure 4:
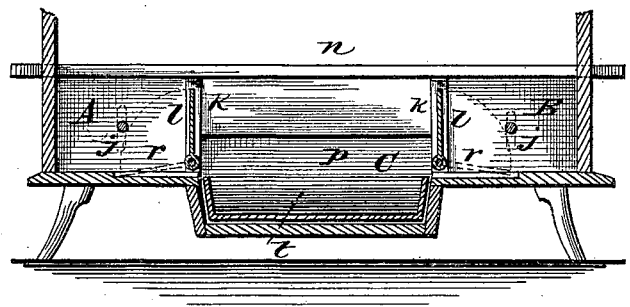

In the accompanying drawings, which form part of my specification, Figure 1 represents a horizontal sectional view or plan of my improvement in stoves. Fig. 2 is a longitudinal section of the same at line $x\ x$ of Fig. 1. Fig. 3 is a longitudinal section of the same at line $y\ y$ of Fig. 1. Fig. 4 is a transverse section of the same at line $z\ z$ of Fig. 1.

Reference being had to the accompanying drawings, which form part of this specification, A B represent the outside flues, and C the center flue, which communicate with the descending flues E F and ascending flue G. In the flues A B are placed scrapers $h\ i$, the handles $j$ of which extend through the length of the flue to the front part of the stove. The flue-plates $k$, at their front ends, are each provided with a valve, $l$, for forming a communication between the outside flues, A B, and the center flue, C, which valves are operated by the handles $m$.

The apron $n$ and pan $o$ and the gates $p\ q$ are of ordinary construction.

The operation of my improvement is as follows: Either or both of the valves $l$ may be raised, so as to cut off communication between the outside flues, A B, and the center flue, C, thereby adjusting the heat of the stove to the condition of the oven—that is to say, if one side of the oven is of a different temperature from the other, by adjustment of the valves $l$ the heat may be regulated so as to heat the oven uniformly. This uneven distribution of the heat is frequently occasioned by a greater deposit of the refuse of combustion in one of the outside flues than in the other. When it is desirable to clean the outside flues of the refuse of combustion the valves $l$ are lowered, as indicated at $r$. The operator then, by means of the handle $j$, draws forward the scrapers $s$, which will draw forward the refuse of combustion, and by turning the valve or valves $l$ upward in the position shown in Fig. 4 will deposit the refuse of combustion in the pan $t$. The operator then replaces the scrapers, as shown in Figs. 2 and 3, and raises the valves $l$, so as to cut off communication between the outside flues, A B, and the center flue, C. He then removes the ash-pan $o$ and the gates $p$ and $q$, and withdraws the pan $t$ and its contents out of the flue C, for the purpose of emptying it, after which it is replaced in said flue, and the gates $p$ and $q$ and pan $o$ are replaced in position.

Having thus described my improvement, what I claim is—

The combination, with the central flue, C, and side flues, A B, communicating therewith, of the scrapers $s$, arranged in said side flues, and the pivoted valves $l$, substantially as and for the purpose herein shown and described.

JAMES A. HORTON.

Witnesses:
 C. W. DUNLAP,
 JOHN W. BEATY.